May 10, 1938.  H. SCHARLAU  2,116,717
DISTANCE AND DIRECTION DETERMINING SYSTEM
Filed June 25, 1935
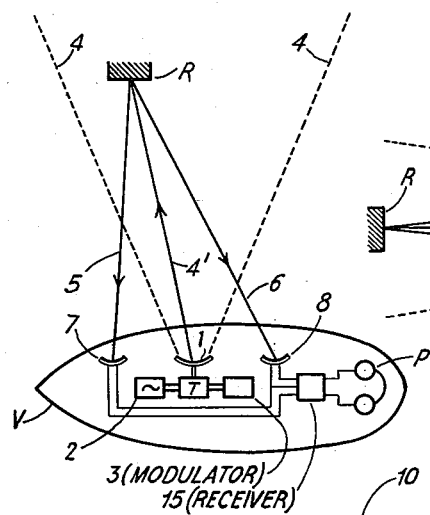
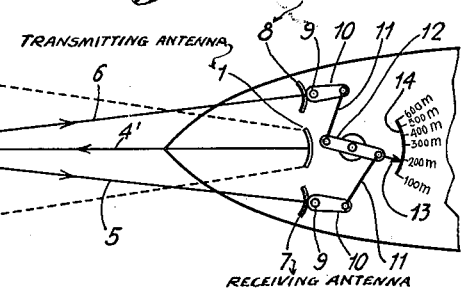
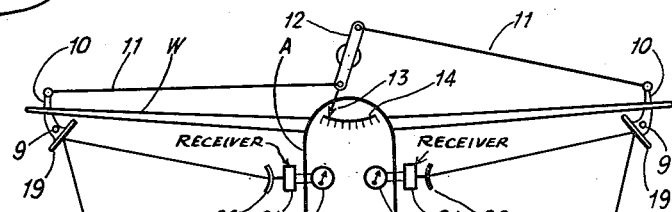
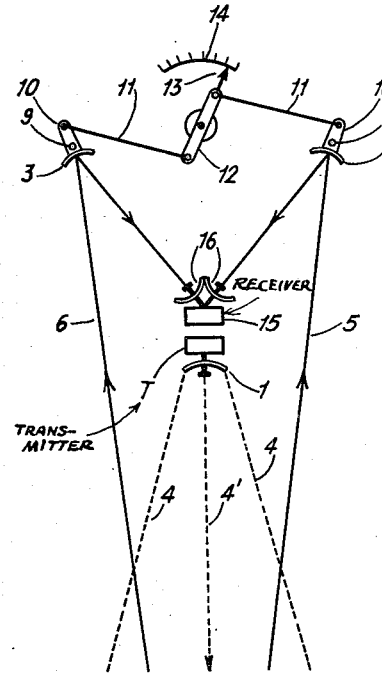
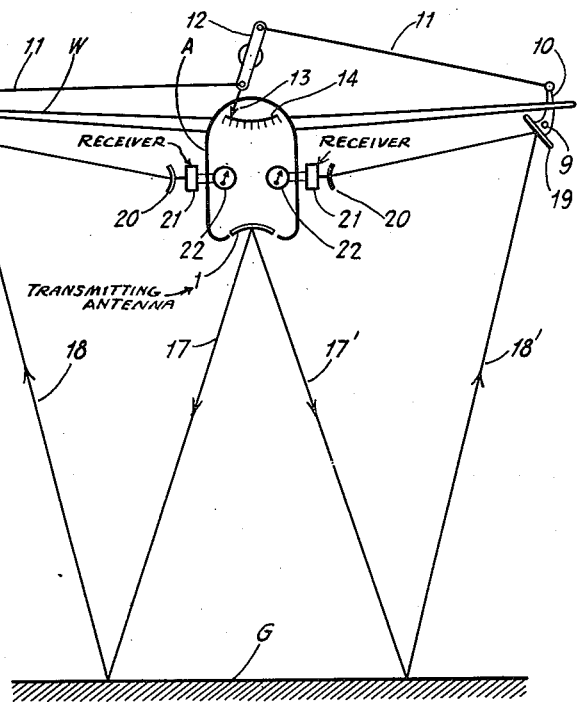
INVENTOR
HANS SCHARLAU
BY
ATTORNEY Patented May 10, 1938

2,116,717

UNITED STATES PATENT OFFICE

2,116,717

DISTANCE AND DIRECTION DETERMINING SYSTEM

Hans Scharlau, Berlin, Germany, assignor to Telefunken Gesellschaft für Drahtlose Telegraphie m. b. H., Berlin, Germany, a corporation of Germany Application June 25, 1935, Serial No. 28,252
In Germany July 5, 1934

11 Claims. (Cl. 250—11)

This invention relates to distance and direction determining systems and is particularly concerned with means to be mounted on board a vessel, an aircraft or other conveyance for projecting a radio beam against either natural or artificial objects from which it may be reflected back to points adjacent the beam projector, and further means for detecting the reflected beams and for indicating the distance and the direction of the reflecting object.

My invention may be used either to avoid collisions between vessels or to determine the altitude at which an airplane may be flying. It is not, however, limited to such uses.

For direction finding with the aid of electromagnetic waves, apparatus has been provided in the past in which the intensity of the incoming signal could be measured. Although known devices have proven fairly satisfactory for direction finding they were not so useful for distance determination. They were usually more or less complicated and required the use of a formula in order to make a distance-calculation from any instrument readings that might be available, based on the intensity of the incoming signal. I have found, however, that radio energy may be so propagated and reflected that, when received at two different points simultaneously, a simple calculation could be made based upon principles of triangulation. It is, therefore, among the objects of my invention to provide mechanical means whereby the desired distance determinations may be easily read on indicators suitably calibrated in units of distance.

It is another object of my invention to provide apparatus for distance and direction determination which may be conveniently mounted on board a vessel for giving warning of the approach of another vessel, the presence of an iceberg, reef, or any dangerous object.

In carrying out my invention I preferably mount on board a vessel a suitable transmitter having an antenna system which is combined with means for directing a beam within the limits of an acute angle. To one side and to the other of this beam projecting antenna system I also mount a pair of receivers each having sharply focussed antenna systems or energy collecting devices. The directional characteristic of each of these receiving antennae is coordinated with that of the other in such manner that a definite indication may be made as to the distance at which their directional axes meet. Since the distance between these two receiving antennae may be very accurately determined, it forms the base line for a system of triangulation such that the distance from a reflecting object may also be very accurately indicated.

The two receiving antennae may be rotatively mounted so as to provide the necessary adjustment for causing their directional axes to intersect one another at different distances from the ship. A uni-control device may be embodied in the apparatus so that both receiving antennae may be adjusted simultaneously and uniformly.

If the two receiving antennae are mounted symmetrically with reference to the axis of the vessel, then the field or region which may be searched for the purpose of indicating reflecting objects or dangerous obstacles may be held within a more or less restricted angular range along the course to be navigated. When energy radiated by the transmitter is reflected back by some object in the path of the vessel then the direction and distance of that object may be accurately determined by the angles which the axes of maximum signalling strength make with the base line between the two receiving antennae.

If my distance and direction finding apparatus is to be used as an aid to aerial navigation, then the transmitter may be mounted so as to project a beam downwardly and the receiving antennae may also be mounted, say, near the wing tips and with their directional axes aimed toward the ground thereby to give indication of altitude at which the airplane may be flying. As an alternative arrangement the receiving antennae may be mounted one near the bow and the other near the stern of an airship.

According to one embodiment of my invention it is preferable to provide separate receiving indicator means in connection with each receiving antenna where great altitudes are to be determined. A uniform angular adjustment of the directional receivers is possible and both instruments will exhibit like reflections or audible response. Where the altitude is low it may be desirable to show differences between the signal-responsive indications or readings of instruments separately operated from the two antennae and thus to obtain an indication of the lateral position, or the dip, or the inclination of the airplane when making a landing. This feature may have particular utility in the operation of bringing down heavy hydroplanes on the water, or when landing a Zeppelin. The utmost advantage is, of course, to be obtained when my invention is so utilized under conditions of poor visibility.

My invention as regards the details of its construction and operation may be best understood upon reference to the accompanying drawing in which Figure 1 represents diagrammatically an arrangement of the essential units of my distance and direction finding system as when mounted aboard a ship for scanning an object along side;

Fig. 2 shows an alternative arrangement in which the field to be scanned lies immediately ahead of the bow of the ship;

Fig. 3 shows diagrammatically one arrangement for controlling the directional effects obtained by rotatively adjusting two reflectors simultaneously in relation to a receiving antenna system; and Fig. 4 shows diagrammatically how my invention may be used for making altitude determinations.

Referring now to Fig. 1, I show, mounted aboard a vessel V, a suitable radio transmitter T upon which oscillations from an oscillator 2 may be impressed. These oscillations may, if desired, be modulated or interrupted in any well known manner by means of the modulator 3. The output energy from the transmitter T is preferably impressed upon an antenna system having a suitable reflector 1 whereby a beam of energy may be projected within the limits of any desired acute angle such as defined by the broken lines 4. Within the scope of this beam any existing object R having reflective properties may be caused to reflect back beams of energy 5 and 6 which can be intercepted by the receiving antennae 7 and 8. The energy so collected by the receiving antennae may then be utilized in a radio receiver 15, or a pair of such receivers, and indications may then be impressed upon any suitable responsive device, such as the earphones P.

The distance of the object R from the vessel V may be accurately determined upon reference to the angles which the beams 5 and 6 make with a base line joining the foci of the two energy collectors 7 and 8. The means for measuring these angles may be as shown in the other figures of the drawing. When the energy collectors are so adjusted as to obtain a maximum signalling energy response, it is then that angular determinations may be made for showing the distance as well as the direction of the reflecting object R.

It is known that the object R need not be artificial in order to possess reflecting properties. Natural objects like rocks, icebergs, derelicts, other vessels, and, in fact, any dangerous obstacles in the path of a vessel may, and usually do, have reflecting properties.

Fig. 2 illustrates an alternative arrangement of my invention for providing protection against collision. Here the transmitter with its radiating antenna system 1 is so mounted, preferably near the bow of a ship, that a beam of radio energy may be directed within the limits of lines 4. If, then, any portion of the beam is reflected back along the lines 5 and 6 on account of the presence of a reflecting object R, then the reflected energy may be received upon the directional antennae 7 and 8. These antennae are preferably of the type which has parabolic reflectors so that the directional axis may be well defined. In order to vary the directional axis of each reflector I preferably mount the antenna and reflector on pivots 9. I then provide control arms 10 which may be swung on the pivots 9. At the end of each control arm I provide linkages 11 connecting with a member 12 which may be suitably rotated to produce a variable distance of intersection of the antenna axes. At one end of the member 12 I may provide a pointer 13 cooperatively positioned in respect to a scale 14 which may be calibrated either in terms of distance or of the angles which the receiving antenna axes make with a base line. The details of the receiving system which may be employed in connection with the receiving antennae have not been shown in Fig. 2, as they may be well understood from the showing of Fig. 1, or, possibly, from Fig. 4 presently to be described.

Referring now to Fig. 3, I show another modification in which the transmitter T may be the same as shown in Fig. 1. The transmitting antenna system includes a reflector 1 and the beam projected therefrom may be confined within the zone between the lines 4. The axis of such a beam is indicated as 4'. The presence of a reflecting object in the path of the beam 4 will be denoted by the reflection of energy along the lines 5 and 6, which energy is caused to impinge upon two reflectors 3 and again reflected toward a receiving antenna system 16 having parabolic energy collectors. The reflectors 3 may be mounted upon pivots 9 and their directional characteristics may be adjusted by means of the lever arms 10, the linkages 11 and the adjusting member 12 upon the end of which is also mounted a pointer or other indicator 13 in cooperative association with a scale 14. The adjustment of the reflectors 3, as shown in Fig. 3, may be caused to double the significant angles and hence to increase the accuracy of the scale readings. The receiving apparatus to which the receiving antennae 16 may be connected is shown at 15.

Fig. 4 shows an aircraft or airplane having a fuselage A and wings W. The equipment of my invention may be installed with a transmitting antenna and directional reflector 1 for projecting a beam within the limits of the lines 17 and 17'. Some of the energy so projected may be reflected back by the surface of the ground G along the lines 18 and 18' respectively. Auxiliary reflectors 19 may be mounted near the wing tips. The directional effect of these auxiliary reflectors 19 may be varied by pivoting the same at 9. The control arms 10 are shown in this figure as mechanically coupled by the linkages 11 to the control member 12. This member also has a pointer 13 arranged to move along the scale 14. The energy impinging upon the reflectors 19 may again be directed against the energy collectors 20 and thence lead to suitable receivers 21. In this case I preferably employ a separate indicating device or instrument 22 in connection with each receiver 21.

Banking of the airplane would be indicated by an unequal intensity of the received signal on the two receiving antennae 20 so that the readings on the two instruments 22 would not then be the same. If the reflectors 19 were to be mounted fore and aft, then a difference between the indications as provided on the two indicators 22 would be of assistance in determining the dip. The altitude may simultaneously be indicated by calibrating the scale 14 in terms of height.

Among the applications of my invention may be mentioned its practical use on vessels which navigate extensively along coastal regions and the mouths of rivers or where there are numerous beacons and lighthouses. If such beacons are provided with radio energy transmitters, the transmitter aboard the vessel may be dispensed with.

Although I have shown mechanical means for obtaining simultaneous and joint control of the directional effect of the receiving antennae 7 and 8 or of the reflectors 3 or 19, it will be readily understood by those skilled in the art that this uni-control may also be obtained through the use of electrical means, if desired.

Many modifications of my invention not herein specifically described will suggest themselves to those skilled in the art in view of the basic idea herein disclosed. The particular embodiments herein shown are, therefore, to be considered as merely examples of apparatus which may be otherwise varied without departing from the spirit and scope of my invention.

I claim:

1. In a distance and direction determining system, a radio beam projector mounted aboard a vessel and adapted to transmit energy suitable for reflection by natural and artificial objects, a pair of energy collectors mounted aboard the same vessel and having sharply focussed directional characteristics, means for varying the angular relationship between the directional axes of said collectors, energy translating means for indicating the intensities of the energy picked up by said collectors when said energy emanates from said projector and is reflected back to said collectors, and means for indicating the angular relationship between the directional axes of said collectors when said axes are adjusted to give maximum response in said energy translating means 2. A system in accordance with claim 1 and having means for directly indicating the distance between said projector and one of said reflecting objects as a function of the angular relationship between the directional axes of said collectors when the latter are adjusted to give maximum response in said energy translating means.

3. A system in accordance with claim 1 and having means for indicating the direction of one of said reflecting objects as a function of the angle between the directional axis of one of said energy collectors and a base line joining the foci of the two said energy collectors.

4. A system in accordance with claim 1 and further characterized in that said energy collectors are symmetrically mounted in reference to the axis of radiation of said radio beam projector.

5. In a system for warning a navigator of the dangerous proximity of an object with which his vessel might collide, a transmitter mounted aboard said vessel and having a directional radio beam projector adapted to be aimed along the vessel's course, receiving apparatus having two sharply focussed energy collecting devices connected thereto, said devices being rotatively adjustable so that the axes of their directional characteristics may meet at a variable distance from the vessel, means for indicating the intensity of the radio energy collected by said devices, and means operable, when said collected energy is a maximum, for indicating the distance from said vessel of an object by which said energy is reflected upon said collecting devices after propagation from said projector, 6. A system in accordance with claim 5 and having a uni-control device for simultaneously rotating said energy collecting devices into suitable position for obtaining a maximum response in said intensity indicating device.

7. In an altitude meter, means for projecting a radio beam downwardly from an aircraft, a receiver having two separated radio energy collecting antennae so mounted on said aircraft as to receive ground reflections of said energy, uni-control means for simultaneously varying the directive characteristics of said antennae to obtain a maximum response in said receiver, and a scale-and-pointer indicating device operatively associated with said uni-control means and calibrated in units of altitude measurement.

8. Apparatus in accordance with claim 7 and having means for indicating a difference between the respective responses to energy collected by one said antenna in relation to the energy collected by the other said antenna.

9. In a distance determining system, a radio beam projector mounted aboard a vessel and adapted to transmit a modulated or interrupted carrier wave suitable for reflection by natural or artificial objects, a pair of reflectors mounted aboard said vessel and so positioned as to receive re-radiated energy from said natural or artificial objects, a radio receiver having an antenna system suitably disposed to receive energy reflected by said pair of reflectors, means for simultaneously adjusting said reflectors so as to produce a maximum response in said receiver, and means for causing an indication to be given by the adjustment of said reflectors at the time of maximum receiver-response, said indication being in terms of distance separating said projector from said natural or artificial objects.

10. A distance determining system comprising a radio energy projector mounted aboard a vessel and adapted to transmit a wave suitable for reflection by an intercepted object, a pair of directional energy collectors mounted aboard said vessel and spaced apart by a distance such as to form the base line in a system of triangulation where the other two sides of the triangle are constituted by the directional axes of said energy collectors respectively, receiving means connected to said energy collectors and means for varying the angles subtended between said base line and said other lines of the triangle while causing said receiving means to respond to the energies collected, thereby to indicate the directional setting of said energy collectors suitable for maximum receiver response to energy reflected by said object.

11. A distance determining system in accordance with claim 10, and having a pointer-and-scale mechanism connected to said directional energy collectors and arranged to indicate the distance separating said intercepted object from the base line of the triangulation system as a function of the angles respectively subtended between each of said directional axes of said energy collectors and said base line.

HANS SCHARLAU.